United States Patent
Ohba et al.

(10) Patent No.: US 6,756,979 B2
(45) Date of Patent: Jun. 29, 2004

(54) IMAGE PROCESSING METHOD, IMAGE PROCESSING APPARATUS, COMPUTER PROGRAM, AND SEMICONDUCTOR DEVICE

(75) Inventors: Akio Ohba, Kanagawa (JP); Masaaki Oka, Kanagawa (JP); Naoto Yoshioka, Tokyo (JP)

(73) Assignee: Sony Computer Entertainment Inc. (JP)

(*) Notice: Subject to any disclaimer, the term of this patent is extended or adjusted under 35 U.S.C. 154(b) by 180 days.

(21) Appl. No.: 10/002,312

(22) Filed: Oct. 24, 2001

(65) Prior Publication Data
US 2002/0158869 A1 Oct. 31, 2002

(30) Foreign Application Priority Data

Oct. 24, 2000 (JP) .................................... P2000-324553
Oct. 5, 2001 (JP) .................................... P2001-310309

(51) Int. Cl.[7] .............................................. B06T 15/50
(52) U.S. Cl. ........................................ 345/426; 345/423
(58) Field of Search ................................. 345/423, 426

(56) References Cited

U.S. PATENT DOCUMENTS 4,943,938 A * 7/1990 Aoshima et al. ............ 345/422
6,552,726 B2 * 4/2003 Hurley et al. ............... 345/426

FOREIGN PATENT DOCUMENTS

| EP | 0 753184 B1 | 1/1997 |
| JP | 11-353498 A | 12/1999 |
| JP | 2001-148030 A | 5/2001 |
| WO | WO95/27268 A1 | 10/1995 |

* cited by examiner

Primary Examiner—Mark Zimmerman
Assistant Examiner—Michael Whelpley
(74) Attorney, Agent, or Firm—Lerner, David, Littenberg, Krumholz & Mentlik, LLP (57) ABSTRACT

An image processing apparatus includes a normal vector mapping section for dividing a surface of an object into a plurality of divided surfaces and generating a first normal vector pointing to the vertical direction of each of the divided surfaces, a luminance value mapping section for replacing the first normal vector of each divided surface with a luminance value associated with one of a predetermined number of second normal vectors, each associated with a different luminance value, which is most analogous in characteristic to the first normal vector, and a graphic processor for shading each divided surface according to the replaced luminance value.

22 Claims, 5 Drawing Sheets

| POLYGON 1 ||
|---|---|
| VECTOR NUMBER | LUMINANCE VALUE |
| 1 | $\alpha 1$ |
| 2 | $\alpha 2$ |
| 3 | $\alpha 3$ |
| 4 | $\alpha 4$ |
| 5 | $\alpha 5$ |
| 6 | $\alpha 6$ |
| 7 | $\alpha 7$ |
| 8 | $\alpha 8$ |

IMAGE PROCESSING METHOD, IMAGE PROCESSING APPARATUS, COMPUTER PROGRAM, AND SEMICONDUCTOR DEVICE

CROSS-REFERENCE TO RELATED APPLICATIONS

This application is based upon and claims the benefit of Japanese Patent Application Nos. 2000-324553 filed on Oct. 24, 2000 and No. 2001-310309 filed on Oct. 5, 2001, the entire disclosures of which are incorporated herein by reference.

BACKGROUND OF THE INVENTION

The present invention relates to an image processing technique in computer graphics and particularly to a method for easily expressing irregularities on a surface of an object to be subjected to image processing.

In a system for computer graphics, there is an image processing system including (i) an image generator that performs processing such as coordinate conversion including rotation, movement, and scaling, and perspective transformation, shading, and hidden-line/surface removal with respect to an object, and (ii) a graphic processor that draws an image in frame memory.

The image generator generates a graphic instruction (a display list) for drawing a basic graphics (polygon) such as a triangle, rectangle as a result of the above processing in frame memory, which is graphic memory, and sends it to the graphic processor.

The graphic processor draws the image on the frame memory in accordance with the display list sent from the image generator. The graphic result in the frame memory is converted to a video signal and is displayed on a display, making it possible to visually identify the image.

The application field of such an image processing system has grown exponentially in recent years, and this is widely used in not only the industrial field such as CAD (Computer Aided Design) but also in the entertainment field such as in movies, television, and videogames. Particularly, in the entertainment field, the ability to express as real an image as possible at high speed has been desirable in addition to simply displaying the object on the display.

As a method for improving expressive power of computer graphics to obtain a real image, texture mapping is used. Texture mapping adheres (maps) a two-dimensional image (picture) prepared separately from the mapping mage, namely a texture onto the polygon, which constitutes an object and which is the basic graphics.

However, the image obtained by texture mapping can greatly improve the expressive power relating to the color but has difficulty in expressing irregularities on the surface of object. This causes a problem in which the surface of object is so smooth that a realistic expression cannot be obtained.

If modeling is performed that includes the irregularities on the surface of object in detail, an extremely realistic expression may be possible, but the amount of data increases and high-speed image processing cannot be carried out. In addition, it takes a lot of time to carry out modeling itself. Accordingly, this is not a practical method.

Conventionally, bump mapping is used to which the texture mapping is applied as a method for easily expressing the irregularities on the surface of object. The bump mapping can be explained as follows: the surface of an object is divided into a plurality of divided surfaces. Then, a plurality of normal vectors in which their directions are fixed independently are mapped onto the respective divided surfaces. A shading process is carried out based on these normal vectors so as to obtain corresponding luminance values. Then, the divided surfaces are shaded according to the obtained luminance values so as to express unevenness or irregularities on the surface of the object in a pseudo manner. This makes it possible to implement an image resembling the object precisely modeled with a small amount of data.

On the other hand, there is a color lookup table (hereinafter referred to as "CLUT"), which is often used when conversion of color is needed in computer graphics. The CLUT is used as a color conversion table at a color conversion time in computer graphics. The CLUT provides a realistic image with respect to the color. However, the realistic expression is determined depending on the modeling, similar to the texture mapping.

Bump mapping is one of the useful methods currently used to easily express the irregularities on the surface of an object.

However, since the normal vectors mapped onto the divided surfaces are different vectors, respectively, a shading process must be performed based on all normal vectors. Thus, for example, if each divided surface is formed to have the size equivalent to the size of one pixel and the normal vector is mapped onto each divided surface in order to precisely express the irregularities on the surface of object, it takes much time to carry out the shading process, so that high-speed processing cannot be implemented.

SUMMARY OF THE INVENTION

It is an object of the present invention is to provide a technique for allowing image processing such as bump mapping to be carried out at high speed regardless of fineness of an image.

According to one aspect of the present invention, there is provided an image processing method comprising the steps of: dividing a surface of an object of image data into a plurality of areas; generating a first normal vector for each of the plurality of areas; determining second normal vectors each having identification data, wherein the number of the second normal vectors is smaller than the number of the first normal vectors; classifying the first normal vectors into the second normal vectors; assigning each of the second normal vectors to at least one of the plurality of areas where the correspondingly classified first normal vector has been generated; and shading each of the plurality of areas based on the identification data of the corresponding second normal vector.

The identification data may include a luminance value.

The surface of the object may consist of at least one polygon.

Each of the plurality of areas may consist of one pixel.

The first normal vectors may be classified into the second normal vectors according to directions of the first normal vectors.

The second normal vectors may be generated based on the first normal vectors.

The step of determining the second normal vectors may comprise the steps of: classifying the first normal vectors into a plurality of groups according to directions of the first normal vectors, wherein the number of the plurality of groups is equal to the number of the second normal vectors;

averaging the classified first normal vectors in each group; and generating each of the second normal vectors corresponding to one of the averaged first normal vectors.

According to another aspect of the present invention, there is provided an image processing apparatus comprising: first means for dividing a surface of an object of image data into a plurality of areas, and generating a first normal vector for each of the plurality of areas; second means for determining second normal vectors each having identification data, wherein the number of the second normal vectors is smaller than the number of the first normal vectors; third means for classifying the first normal vectors into the second normal vectors, and assigning each of the second normal vectors to at least one of the plurality of areas where the correspondingly classified first normal vector has been generated; and fourth means for shading each of the plurality of areas based on the identification data of the corresponding second normal vector.

The apparatus may further comprise: fifth means for adding a luminance value to each of the identification data; and sixth means for generating table data in which each of the luminance values and the corresponding identification data are linked with each other.

The identification data may include a luminance value.

The surface of the object may consist of at least one polygon.

Each of the plurality of areas may consist of one pixel.

The first normal vectors may be classified into the second normal vectors according to directions of the first normal vectors.

The second normal vectors may be generated based on the first normal vectors.

The second means may comprise: means for classifying the first normal vectors into a plurality of groups according to directions of the first normal vectors, wherein the number of the plurality of groups is equal to the number of the second normal vectors; means for averaging the classified first normal vectors in each group; and means for generating each of the second normal vectors corresponding to one of the averaged first normal vectors.

According to another aspect of the present invention, there is provided a semiconductor device comprising: first means for dividing a surface of an object of image data into a plurality of areas, and generating a first normal vector for each of the plurality of areas; second means for determining second normal vectors each having identification data, wherein the number of the second normal vectors is smaller than the number of the first normal vectors; third means for classifying the first normal vectors into the second normal vectors, and assigning each of the second normal vectors to at least one of the plurality of areas where the correspondingly classified first normal vector has been generated; and fourth means for shading each of the plurality of areas based on the identification data of the corresponding second normal vector.

According to another aspect of the present invention, there is provided a computer program for causing a computer to execute the steps of: dividing a surface of an object of image data into a plurality of areas; generating a first normal vector for each of the plurality of areas; determining second normal vectors each having identification data, wherein the number of the second normal vectors is smaller than the number of the first normal vectors; classifying the first normal vectors into the second normal vectors; assigning each of the second normal vectors to at least one of the plurality of areas where the correspondingly classified first normal vector has been generated; and shading each of the plurality of areas based on the identification data of the corresponding second normal vector.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

An embodiment of the present invention will now be specifically described with reference to the drawings herewith.

An image processing apparatus of the present invention is implemented by a computer that forms various functions relating to image processing by reading and executing a computer program. A computer 1 of the present embodiment has two buses including a main bus B1 and a sub-bus B2 to which a plurality of semiconductor devices each having a unique function are connected, and executes entertainment processing using an image processing technique.

These buses B1 and B2 are connected/disconnected to/from each other via a bus interface INT as required.

A main CPU 10, main memory 11, main DMAC, (Direct Memory Access Controller) 12, MPEG (Moving Picture Experts Group) decoder (MDEC) 13, and graphic processing unit (hereinafter referred to as GPU) 14 are connected to the main bus B1. The main CPU 10 is a semiconductor device to construct an execution environment for image processing, the main memory 11 is composed of RAM, and the graphic processing unit includes frame memory 15 serving as graphic memory. A CRTC (CRT controller 16), which produces a video output signal to display data drawn in the frame memory 15 on a display (not shown), is connected to GPU 14.

The main CPU 10 reads a startup program from ROM 23 on sub-bus B2 via the bus interface INT when the computer 1 is started, and executes the start-up program to run an operating system. The main CPU 10 also controls a media drive 27, and reads an application program or data from a piece of media 28 loaded on the media drive 27, and stores the resultant into the main memory 11. Moreover, the main CPU 10 provides geometry processing (coordinate value computation processing) for expressing the shape and motion of object to three-dimensional object data (coordinate values of vertex of polygon, etc.). The three-dimensional object is composed of various kinds of data read from the piece of media 28, for example, a plurality of basic graphics (polygons). Then, the main CPU 10 generates a display list having the contents including polygon definition information (the shape of the polygon and the drawing position, the specification of the kind of material, color, texture, etc. to form the polygon) based on the geometry processing.

The CPU 14 is a semiconductor device having a function of holding a graphic context (graphic data including the material of the polygon) to perform rendering processing (graphic processing) after reading a necessary graphic context according to the display list sent from the main CPU 10 to draw the polygon into the frame memory 15. The frame memory 15 is used as a texture memory. For this reason, a pixel image in the frame memory 15 can be adhered onto the polygon that is drawn as a texture.

The main DMAC 12 is a semiconductor device that performs DMA transfer control to each circuit connected to the main bus B1 and also performs DMA transfer control to each circuit connected to the sub-bus B2. The MDEC 13 is a semiconductor device, which operates in parallel with the main CPU 10, and which has a function of expanding data compressed in the MPEG (Moving Picture Experts Group) or JPEG (Joint Photographic Experts Group) format.

Sub-CPU 20, sub-memory 21, sub-DMAC 22, ROM 23, sound processing semiconductor device (Sound Processing Unit, SPU) 24, communication controller (ATM) 26, media drive 27, and input section 31 are connected to the sub-bus B2. The sub-CPU 20 is composed of a microprocessor and the like, sub-memory 21 is composed of RAM, ROM 23 stores a control program such as an operating system, and SPU 24 reads sound data stored in sound memory 25 and outputs it as an audio output. Also, ATM 26 transmits/receives information to/from an outer unit via a network (not shown), and the media drive 27 loads media 28 such as CD-ROM, DVD-ROM thereon.

The sub-CPU 20 performs various kinds of operations according to the control program stored in ROM 23. The sub DMAC 22 is a semiconductor device that performs control such as DMA transfer with respect to each circuit connected to the sub-bus B2 only when the bus interface INT disconnects the main bus B1 from the sub-bus B2. The input section 31 has a connection terminal 32 to which an input signal is input from an operating unit 33.

Note that the present specification explains only the image and omits the explanation of sound for the sake of convenience.

Figure 2:
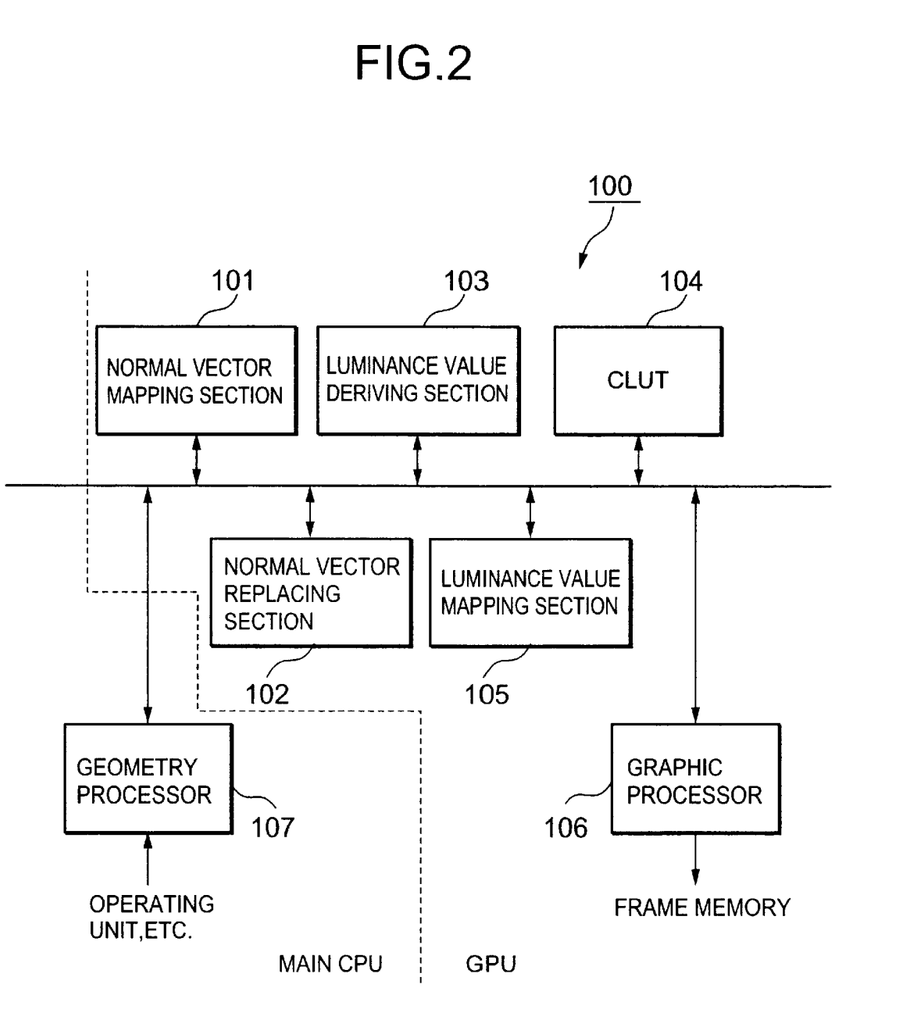
FIG. 2 is a diagram showing main functional blocks of an image processing apparatus according to an embodiment of the present invention.

The computer 1 thus configured forms functional blocks that are useful for performing an operation as an image processing apparatus 100 when the main CPU 10 and GPU 14 read the computer program in accordance with one or more aspects of the present invention from a storage medium such as ROM 23 and media 28. The functional blocks include a normal vector mapping section 101, a normal vector replacing section 102, a luminance value deriving section 103, a CLUT 104, a luminance value mapping section 105, a graphic processor 106, and a geometry processor 107 as illustrated in FIG. 2.

Figure 1:
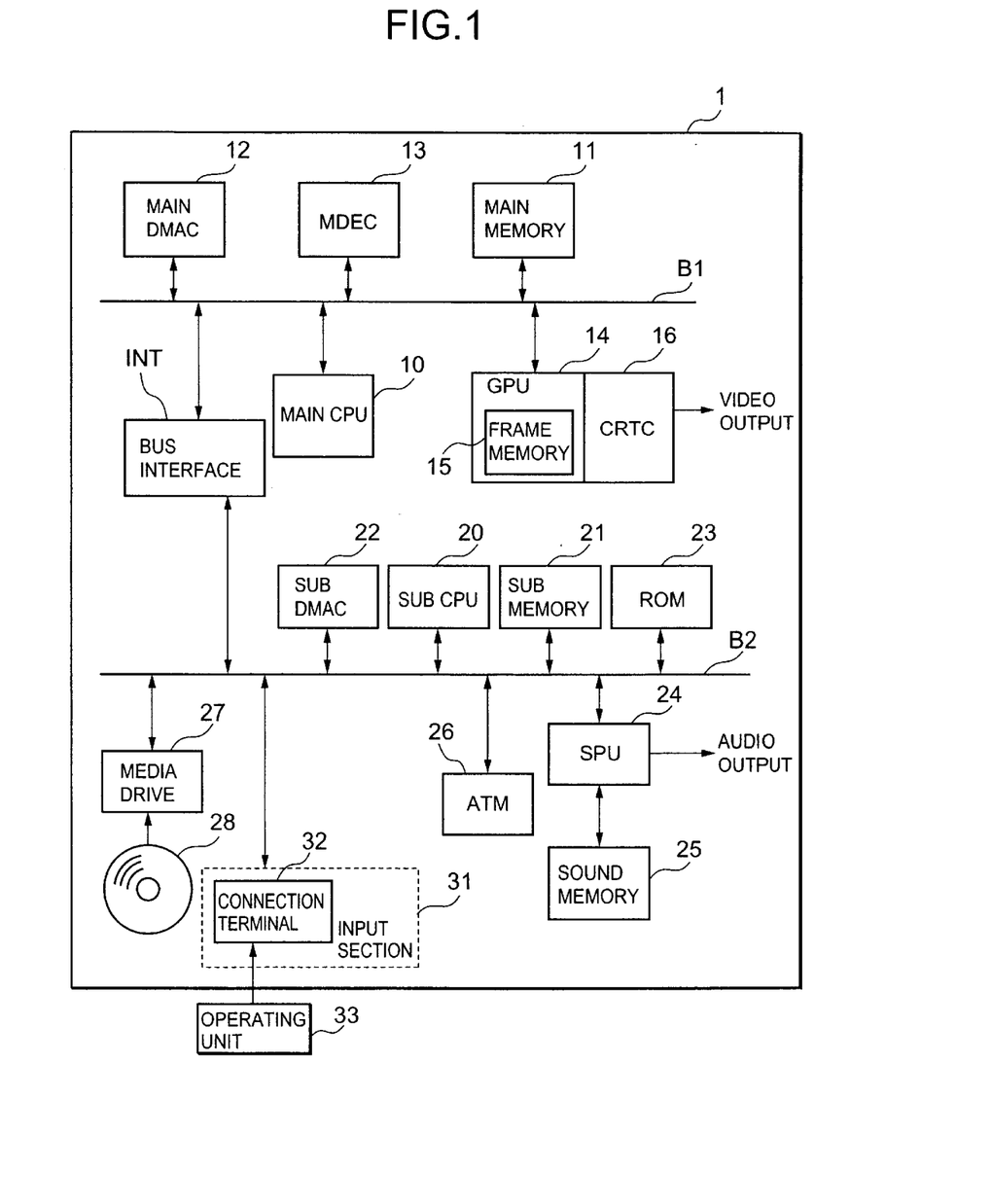
FIG. 1 is a diagram showing a hardware structure of a computer according to an embodiment of the present invention.

In view of hardware illustrated in FIG. 1, the normal vector mapping section 101, normal vector replacing section 102, luminance value deriving section 103, CLUT 104, luminance value mapping section 105, and graphic processor 106 are formed by GPU 14, and the geometry processor 107 is formed by the main CPU 10.

The image processing apparatus 100 is configured in such a way to reduce an amount of processing for obtaining luminance values based on normal vectors and implement high-speed bump mapping. More specifically, regarding the divided surfaces obtained by dividing a surface to be subjected to bump mapping, a normal vector (individual normal vector) for each divided surface is replaced with a reference normal vector which is most analogous in characteristic to the individual normal vector among a predetermined number of reference normal vectors. The number of the reference normal vectors is set smaller than that of the divided surfaces. Then, the luminance value of each of the reference normal vectors is obtained. After that, the divided surfaces are respectively shaded based on these obtained luminance values, thereby expressing irregularities on the surfaces.

An explanation will now be next given for each functional block of the image processing apparatus 100.

The geometry processor 107 performs geometry processing in accordance with the input from the operating unit 33 and generates a display list as a resultant of geometry processing. Regarding the polygon to be subjected to bump mapping, information indicating that bump mapping should be performed is added to the generated display list, thereby providing recognition that the polygon to be subjected to bump mapping. Whether or not bump mapping should be performed is determined by a developer during modeling.

The normal vector mapping section 101 specifies the polygon to be subjected to bump mapping based on the display list generated by the geometry processor 107. Then, the normal vector mapping section 101 divides the surface of the specified polygon and maps the individual normal vector onto each divided surface. The direction of each individual normal vector is fixed independently of other individual normal vectors. Namely, the individual normal vector whose direction is determined independently of other divided surfaces is mapped onto each of the plurality of divided surfaces obtained by dividing the polygon surface.

The individual normal vectors may be determined by providing fluctuations to the normal vector that points to the vertical direction of the surface of polygon, and changing the direction at random by the fluctuations. Also, the individual normal vector for each divided surface may be included in the display list as a part of information that expresses the polygon.

In the plurality of reference normal vectors each identified by a different identification information, the normal vector replacing section 102 replaces the individual normal vector mapped onto each divided surface of polygon with the reference normal vector which is most analogous in characteristic to the individual vector. Then, the normal vector replacing section 102 maps identification information of the replaced reference normal vector onto the corresponding divided surface.

The reference normal vector, which is most analogous in characteristic to the individual vector, is, for example, a reference normal vector whose direction is most analogous to the individual normal vector.

For example, the individual normal vectors are subjected to vector quantization and all the individual normal vectors are grouped by direction. Then, an average vector of individual normal vectors in each group can be used as a reference normal vector.

The reference normal vectors may be prepared in advance during modeling.

The number of reference normal vectors is set to be smaller than that of individual normal vectors.

The luminance value deriving section 103 derives the luminance value based on each reference normal vector.

For example, the luminance value deriving section 103 performs a shading process based on each reference normal vector so as to derive the luminance value. The luminance value deriving section 103 writes the derived luminance value to CLUT 104 with identification information of the corresponding reference normal vector.

The CLUT 104 is a table where the derived luminance value from the luminance value deriving section 103 and identification information of the corresponding reference normal vector are written.

Figure 5:
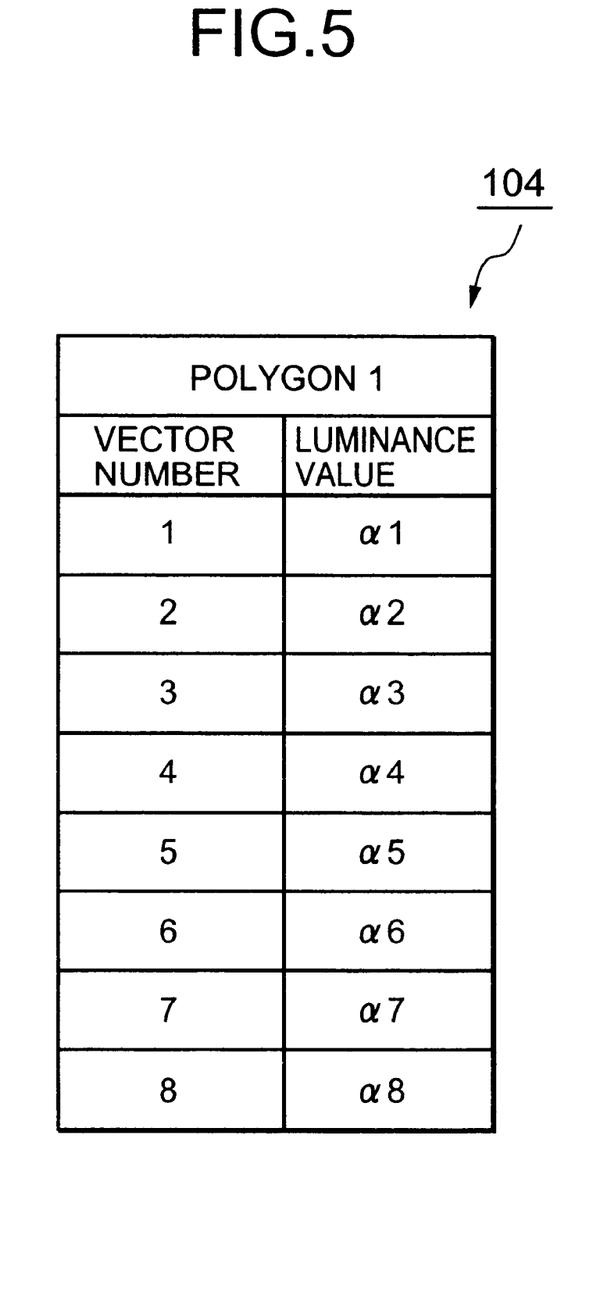
FIG. 5 is a diagram showing a CLUT.

FIG. 5 is a view illustrating CLUT 104. Here, identification information "1" to "8" for identifying the reference normal vectors of the polygon named, as polygon 1 and luminance values "α1" to "α8" which correspond to identification information respectively, are recorded thereon to be associated with each other.

The luminance value mapping section 105 maps the luminance value associated with the corresponding identification information onto each divided surface of the polygon where identification information is mapped with reference to CLUT 104.

The graphic processor 106 draws an image corresponding to the display list in the frame memory 15. Particularly, in connection with the polygon where the luminance value is mapped by the luminance value mapping section 105, the graphic processor 106 draws the image in such a way to reflect the luminance value in the texture that is instructed to be mapped onto the corresponding polygon based on the display list.

The aforementioned image processing apparatus 100 can perform bump mapping through the steps described below.

Figure 3:
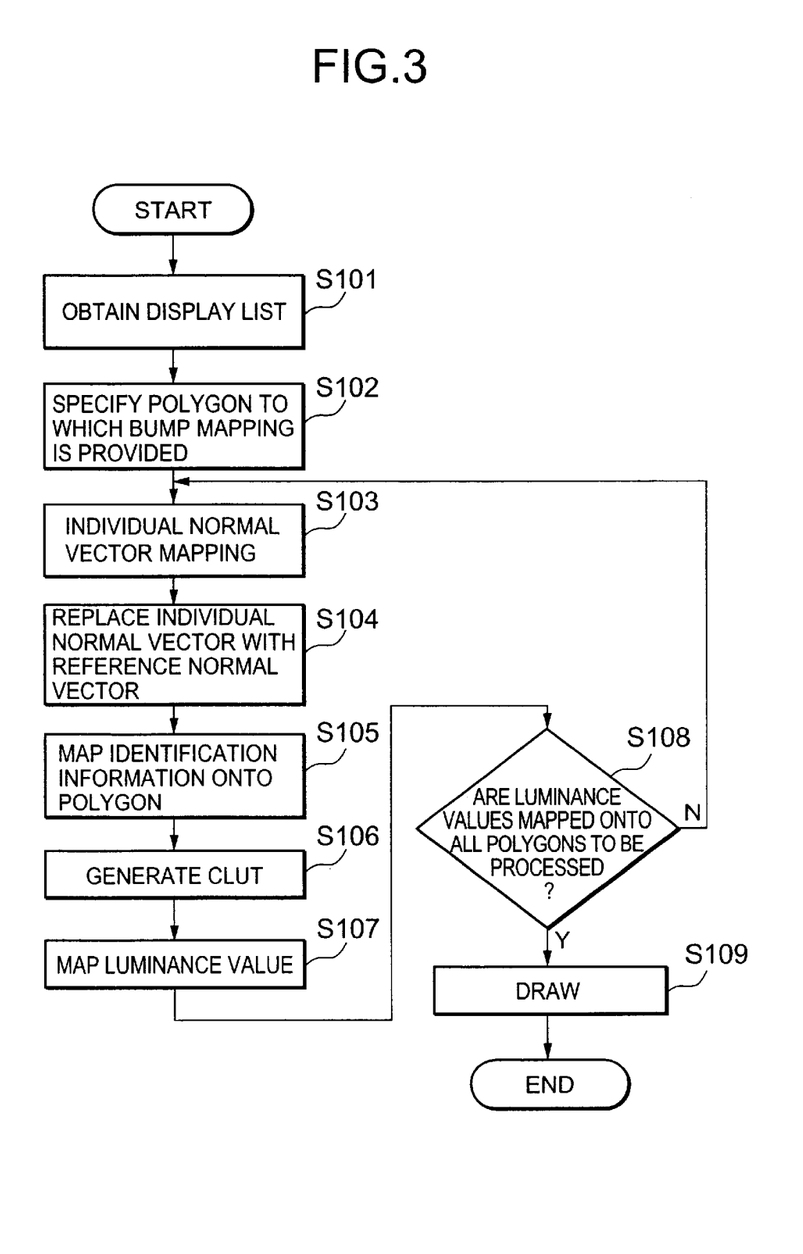
FIG. 3 is a flowchart of bump mapping according to an embodiment of the present invention.

FIG. 3 is a flowchart illustrating the steps of bump mapping processing carried out by the image processing apparatus 100 of the present invention.

The display list generated by the geometry processor 107 is sent to the normal vector mapping section 101. The normal vector mapping section 101 obtains the display list sent from the geometry processor 107 (step S101).

Next, the normal vector mapping section 101 specifies the polygon to be subjected to bump mapping by the display list (step S102). In the case where the number of polygons to be subjected to bump mapping is two or more, the normal vector mapping section 101 specifies all polygons.

When specifying the polygon to be subjected to bump mapping, the normal vector mapping section 101 divides the surface of the specified polygon into a plurality of divided surfaces, and maps the individual normal vector onto each divided surface. In this embodiment, the surface of polygon is divided in such a way that the divided surface is equivalent to the size of one pixel when it is displayed on the display. Namely, the individual vector is mapped onto all pixels that constitute the polygon. This makes it possible to obtain a precise expression of irregularities.

Figure 4A:
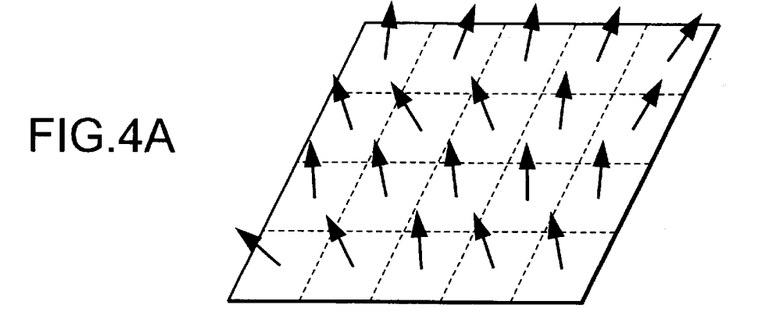
FIG. 4A is a diagram showing a polygon wherein individual normal vectors are mapped onto respective pixels.

FIG. 4A is a view illustrating the polygon to which the individual normal vectors are mapped in unit of pixel (e.g., on a pixel-by-pixel basis). One pixel represents one rectangle and twenty pixels form one rectangular polygon. The individual normal vectors as indicated by arrows are mapped onto the respective pixels. The direction of each individual normal vector is fixed independently of other individual normal vectors.

The normal vector replacing section 102 replaces the individual normal vector mapped onto each pixel of polygon with the reference normal vector which is most analogous in characteristic to the individual vector among the plurality of reference normal vectors (step S104). In this embodiment, the individual normal vector mapped onto every pixel is replaced with the reference normal vector which is most analogous in characteristic to the individual normal vector among eight reference normal vectors. Then, identifying information that identifies the replaced reference normal vector is mapped onto each divided surface (step S105).

Figure 4B:
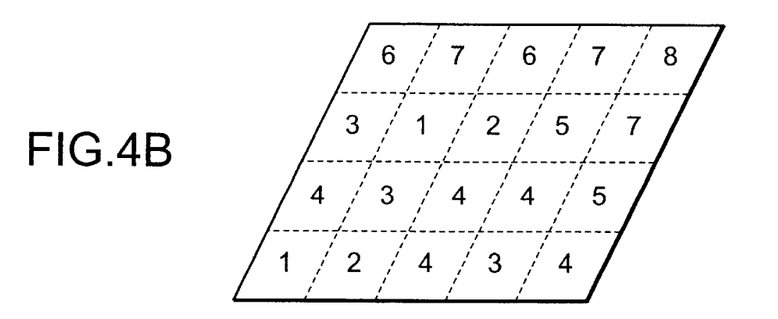
FIG. 4B is a diagram showing a polygon wherein identification information is mapped onto respective pixels.

FIG. 4B is a view illustrating a polygon when identification information is mapped onto the respective pixels in the above-mentioned way.

The luminance value deriving section 103 performs a shading process based on each reference normal vector and writes the luminance value resulting from the shading process into the CLUT 104 (step S106). In other words, the luminance value deriving section 103 performs a shading process based on each of eight reference normal vectors and derives the luminance value. The identification information of the reference normal vector and the derived luminance value are written into the CLUT 104 to be associated with each other so as to generate the table as illustrated in FIG. 5.

In a case where the number of polygons to be subjected to bump mapping is two or more, a table similar to the above is generated with respect to each polygon. Namely, the number of similar tables is increased with an increase in the number of polygons 2, 3, . . .

The shading process has only to be performed according to the number of reference normal vectors. This makes it possible to largely reduce the time required for deriving the luminance value as compared with the conventional mapping in which the shading process must be performed based on each of all individual normal vectors to be mapped.

For example, in the case of FIG. 4A, the shading process had to be carried out based on each of twenty individual normal vectors to obtain each luminance value. However, in the present embodiment, the shading process may be performed based on eight reference normal vectors to obtain corresponding luminance values.

The number of reference normal vectors can be arbitrarily set. Namely, the number of reference normal vectors may be increased to dedicatedly change the directions of irregularities to obtain a precise expression. While, the number of reference normal vectors may be decreased to perform high-speed processing. The number of reference normal vectors may be determined according to the number of directions of irregularities on the obtained image and the processing speed.

Next, the luminance value mapping section 105 performs mapping of the luminance value onto each divided surface (step S107). Namely, the luminance value mapping section 105 reads the luminance value associated with identification information mapped from the CLUT 104, and maps the luminance value onto each divided surface of polygon.

Figure 4C:
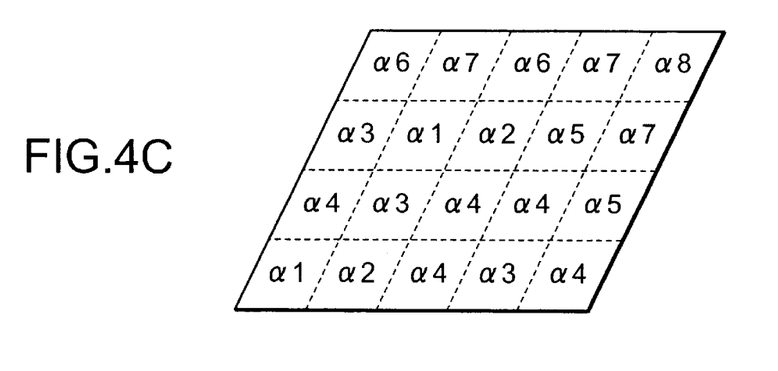
FIG. 4C is a diagram showing a polygon wherein luminance values are mapped onto respective pixels.

FIG. 4C is a view illustrating the polygon in which the luminance value is mapped to each pixel.

In the case where the number of polygons to be subjected to bump mapping is two or more, processing in step S103 to step S107 is repeated with respect to all polygons (step S108: N).

When processing in step S103 to step S107 with respect to all polygons to be subjected to bump mapping is ended (step S108: Y), the graphic processor 106 draws all polygons into the frame memory 15 based on the display list. At this time, the texture adhered to the polygon to which the luminance values are mapped in step S107 is one in which the luminance values are reflected (step S109).

The image thus drawn in the frame memory 15 is converted to a video output by CRTC 16 and is displayed on a predetermined display device, making it possible to visually identify the image including the polygon on which irregularities are expressed by shading.

In the case where the texture is not mapped, the luminance values are used as RGB values and the polygon may be drawn in the frame memory 15 directly.

The image of polygon obtained by the aforementioned processing is subjected to bump mapping based on the individual normal vector mapped every pixel. This results in the precise expression of irregularities. The luminance values relating to only the number of reference normal vectors, which is smaller than that of individual normal vectors, may be derived. For this reason, high-speed bump mapping can be implemented as a whole. Namely, even if the sufficiently precise image is displayed, the load on processing is determined according to number of reference normal vectors. Accordingly, as compared with the conventional case, processing can be speedily ended while maintaining the fineness of the image.

The above explained the bump mapping in unit of polygon surface. However, the present invention is not limited to this, the above-explained bump mapping may be carried out in unit of object, namely, the bump mapping may performed with respect to the entire surface of object to be subjected to image processing.

Moreover, in the present embodiment, identification information for identifying the reference normal vector and the luminance value were generated based on the individual normal vector. However, the present invention is not limited to this, and identification information for identifying the reference normal vector and the luminance value may be prepared in advance. This makes it possible to directly replace the individual normal vector with the luminance value corresponding to the approximate reference normal vector.

The present invention as mentioned above can implement high speed bump mapping easily regardless of the fineness of image as compared with the conventional case.

Various embodiments and changes may be made thereunto without departing from the broad spirit and scope of the invention. The above-described embodiment intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. An image processing method, comprising:
   dividing a surface of an object of image data into a plurality of areas;
   generating a first normal vector for each of said plurality of areas;
   determining second normal vectors each having identification data, wherein the number of said second normal vectors is smaller than the number of said first normal vectors and said second normal vectors are generated based on said first normal vectors;
   associating each of said first normal vectors with one of said second normal vectors;
   assigning each of said second normal vectors to at least one of said plurality of areas; and
   shading each of said plurality of areas based on said identification data of said assigned second normal vector.

2. The method according to claim 1, wherein said identification data includes a luminance value.

3. The method according to claim 1, wherein said surface of said object consists of at least one polygon.

4. The method according to claim 1, wherein each of said plurality of areas consists of one pixel.

5. The method according to claim 1, wherein said first normal vectors are associated with said second normal vectors according to directions of said first normal vectors.

6. The method according to claim 1, wherein the step of determining said second normal vectors comprises:
   classifying said first normal vectors into a plurality of groups according to directions of said first normal vectors, wherein the number of said plurality of groups is equal to said number of said second normal vectors;
   averaging said classified first normal vectors in each group; and
   generating each of said second normal vectors corresponding to one of said averaged first normal vectors.

7. An image processing apparatus, comprising:
   means for dividing a surface of an object of image data into a plurality of areas, and generating a first normal vector for each of said plurality of areas;
   means for determining second normal vectors each having identification data, wherein the number of said second normal vectors is smaller than the number of said first normal vectors and said second normal vectors are generated based on said first normal vectors;
   means for associating each of said first normal vectors with one of said second normal vectors, and assigning each of said second normal vectors to at least one of said plurality of areas; and
   means for shading each of said plurality of areas based on said identification data of said assigned second normal vector.

8. The apparatus according to claim 7, further comprising:
   means for adding a luminance value to each of said identification data; and
   means for generating table data in which each of said luminance values and said corresponding identification data are linked with each other.

9. The apparatus according to claim 7, wherein said identification data includes a luminance value.

10. The apparatus according to claim 7, wherein said surface of said object consists of at least one polygon.

11. The apparatus according to claim 7, wherein each of said plurality of areas consists of one pixel.

12. The apparatus according to claim 7, wherein said first normal vectors are associated with said second normal vectors according to directions of said first normal vectors.

13. The apparatus according to claim 6, wherein said means for determining second normal vectors comprises:
   means for classifying said first normal vectors into a plurality of groups according to directions of said first normal vectors, wherein the number of said plurality of groups is equal to said number of said second normal vectors;
   means for averaging said classified first normal vectors in each group; and means for generating each of said second normal vectors corresponding to one of said averaged first normal vectors.

14. A semiconductor device, comprising:

means for dividing a surface of an object of image data into a plurality of areas, and generating a first normal vector for each of said plurality of areas;

means for determining second normal vectors each having identification data, wherein the number of said second normal vectors is smaller than the number of said first normal vectors and said second normal vectors are generated based on said first normal vectors;

means for associating each of said first normal vectors with one of said second normal vectors, and assigning each of said second normal vectors to at least one of said plurality of areas; and means for shading each of said plurality of areas based on said identification data of said assigned second normal vector.

15. A storage medium containing a program for causing a computer to execute steps comprising:

dividing a surface of an object of image data into a plurality of areas;

generating a first normal vector for each of said plurality of areas;

determining second normal vectors each having identification data, wherein the number of said second normal vectors is smaller than the number of said first normal vectors and said second normal vectors are generated based on said first normal vectors;

associating each of said first normal vectors with one of said second normal vectors;

assigning each of said second normal vectors to at least one of said plurality of areas; and shading each of said plurality of areas based on said identification data of said assigned second normal vector.

16. An image processing apparatus, comprising:

a processor adapted to divide a surface of an object of image data into a plurality of areas, generate a first normal vector for each of said plurality of areas, generate second normal vectors based on said first normal vectors, said second normal vectors having identification data and being less in number than said first normal vectors, associate each of said first normal vectors with one of said second normal vectors, assign each of said second normal vectors to at least one of said plurality of areas, and shade each of said plurality of areas based on said identification data of said assigned second normal vector.

17. The apparatus according to claim 16, further wherein said processor is further adapted to:

add a luminance value to each of said identification data; and generate table data in which each of said luminance values and said corresponding identification data are linked with each other.

18. The apparatus according to claim 16, wherein said identification data includes a luminance value.

19. The apparatus according to claim 16, wherein said surface of said object consists of at least one polygon.

20. The apparatus according to claim 16, wherein each of said plurality of areas consists of one pixel.

21. The apparatus according to claim 16, wherein said processor is further adapted to associate said first normal vectors with said second normal vectors according to directions of said first normal vectors.

22. The apparatus according to claim 16, wherein said processor is further adapted to classify said first normal vectors into a plurality of groups according to the directions of said first normal vectors, average the first normal vectors in each group, and generate each of said second normal vectors based on the average of the first normal vectors in one of said groups.

* * * * *

UNITED STATES PATENT AND TRADEMARK OFFICE
CERTIFICATE OF CORRECTION

PATENT NO. : 6,756,979 B2
DATED : June 29, 2004
INVENTOR(S) : Akio Ohba, Masaaki Oka and Naoto Yoshioka It is certified that error appears in the above-identified patent and that said Letters Patent is hereby corrected as shown below:

Column 10,
Line 58, "claim 6" should read -- claim 7 --.

Signed and Sealed this

Second Day of November, 2004

JON W. DUDAS
*Director of the United States Patent and Trademark Office*